United States Patent [19]

Takasaki

[11] Patent Number: 4,894,958
[45] Date of Patent: Jan. 23, 1990

[54] APPARATUS FOR SCRAPING OFF BURRS AT RESIN OUTER LAYER OF A GOLF BALL

[75] Inventor: Seiichi Takasaki, Takatsuki, Japan

[73] Assignee: Hinode Engineering Kabushiki Kaisha, Tokyo, Japan

[21] Appl. No.: 142,158

[22] Filed: Jan. 11, 1988

[30] Foreign Application Priority Data

Jan. 13, 1987 [JP] Japan ............................ 62-5677

[51] Int. Cl.⁴ .................................. B24B 1/00
[52] U.S. Cl. ...................... 51/289 R; 51/53; 51/108 R; 83/32; 83/914; 83/923; 264/161; 264/162; 425/806
[58] Field of Search .............. 51/289 R, 48 R, 50 R, 51/108 R, 53, 145 T; 83/32, DIG. 914, DIG. 923, 914, 923; 264/161, 162; 425/806; 82/124, 125

[56] References Cited

U.S. PATENT DOCUMENTS 3,610,492 10/1971 Bourgeois ............................ 83/914
3,881,380  5/1975 Paramonoff ......................... 83/923
4,779,387 10/1988 Reid et al. ........................ 51/289 R
4,787,280 11/1988 Voelkerding ....................... 82/125

FOREIGN PATENT DOCUMENTS 232861 5/1985 Japan .

Primary Examiner—Frederick R. Schmidt
Assistant Examiner—Maurina Rachuba
Attorney, Agent, or Firm—Wenderoth, Lind & Ponack

[57] ABSTRACT

An apparatus for scraping off burrs at resin outer layer of a golf ball. According to this method and apparatus, even if some errors exist in the diameter of golf balls of resin outer layer, only burrs can be scraped off automatically at high efficiency, without impairing the degree of true circle of golf balls and without generating deformation of golf balls.

1 Claim, 3 Drawing Sheets

APPARATUS FOR SCRAPING OFF BURRS AT RESIN OUTER LAYER OF A GOLF BALL

BACKGROUND OF THE INVENTION

1. Field of the invention:

This invention relates to a method of scraping off burrs left after formation of a golf ball of resin outer layer and a burr scraping machine for use in carrying out the above method.

2. Prior art:

In manufacturing golf balls, it has been inevitable that ring-like or dot-like burrs are generated along the equator part of each golf ball and such burrs have been scraped off with a sandpaper or a grindstone. However, some errors in diameter are unavoidable in manufacturing golf balls on the mass production basis and therefore if grinding is effected on the basis of the fixed measurement, errors are caused in scraping width, with the result of deterioration of finished goods value and reduction in the rate of good quality articles. Thus, automation of burr scraping by grinding was difficult.

As the step of solving the above problem, the invention made by the present inventor entitled "Method and apparatus for removing burrs of gold balls" (Japanese Patent Application Laying Open Publication Gazette No. 60-232861) is already known. According to this invention, a disc-like grindstone which rotates positively and a pair of upper and lower profiling rollers which are alongside the equator part of a golf ball are held in the fixed position and while the golf ball is being rotated as it is held by an upper and a lower grippers, the equator part of the golf ball is pushed against profile rollers so that it makes contact with the grindstone. By this method, even if there exist some errors in the diameter of golf balls of rubber outer layer, only burrs can be scraped off without impairing the degree of true circle of golf balls and burr removing operation can be carried out at high efficiency. According to this method, burrs are scraped off by grinding, while a grindstone which is rotating positively is made to contact with a rubber golf ball and therefore this method is effective for golf balls or rubber outer layer but is not effective for golf balls of resin outer layer (for example, golf balls of plastic outer layer) because heat is generated by contact of a rotating grindstone with a golf ball and as a result, a golf ball of resin outer layer is deformed and complete scraping off of burrs cannot be done.

SUMMARY OF THE INVENTION

An object of the present invention is to solve the above problems raised in scraping off burrs of golf balls of resin outer layer and provides a method of and an apparatus for scraping off burrs at resin outer layer of golf balls without impairing the degree of true circle of a golf ball, even if some errors exist in the diameter of golf balls, wherein a bite assembly fixed in position to a machine body and a pair of upper and lower profiling rollers provided alongside the equator part of golf ball of resin outer layer are held in the fixed position, and while the golf ball held by upper and lower grippers is being rotated, its equator part is pushed against profiling rollers to make the equator part contact with a bite assembly. Thus, according to the present invention, even if some errors exist in diameter of golf balls, only burrs can be scraped off automatically without impairing the degree of true circle of golf balls or resin outer layer.

BRIEF DESCRIPTION OF THE DRAWING

The nature and advantage of the present invention will be understood more clearly from the following description made with reference to the accompanying drawing, in which:

FIG. 4 and FIG. 5 show a rod-like bite assembly, in which FIG. 4 is a front view of the bite assembly and FIG. 5 is a cross sectional view, taken along the line S—S in FIG. 4.

DETAILED DESCRIPTION OF THE INVENTION

An embodiment of a burr scraping machine to be used for the method according to the present invention is described below, with reference to the accompanying drawing.

Figure 1:
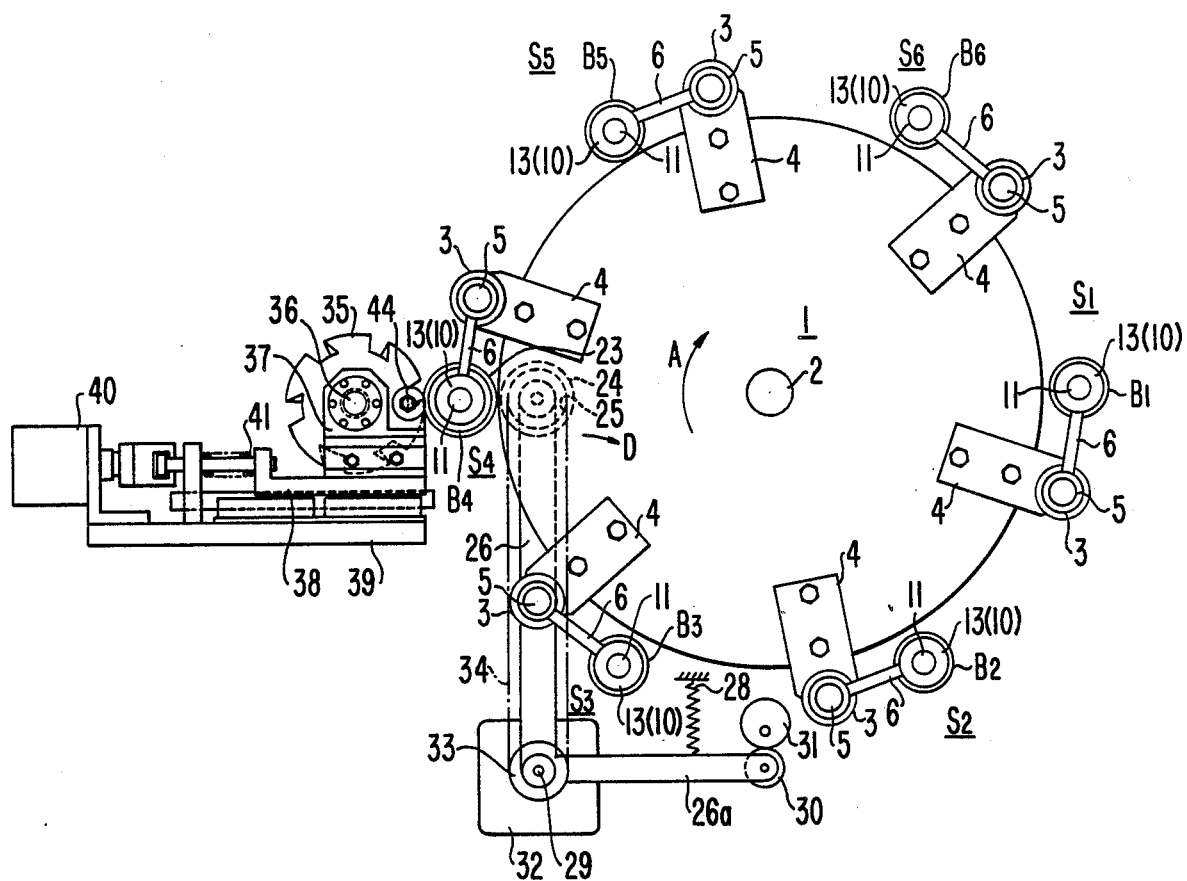
FIG. 1 is a plan view of an embodiment of a burr scraping machine according to the present invention.
Figure 2A:
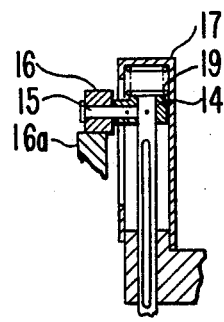
FIG. 2 is a cross sectional view of the center of scraping machine in FIG. 1.
Figure 2:
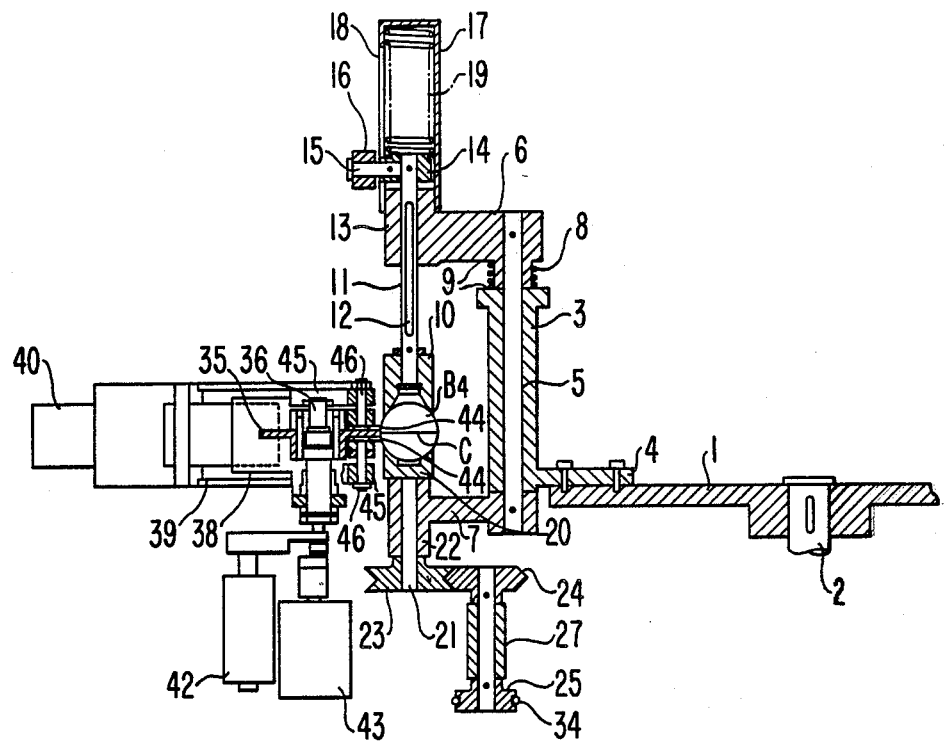
Figure 3:
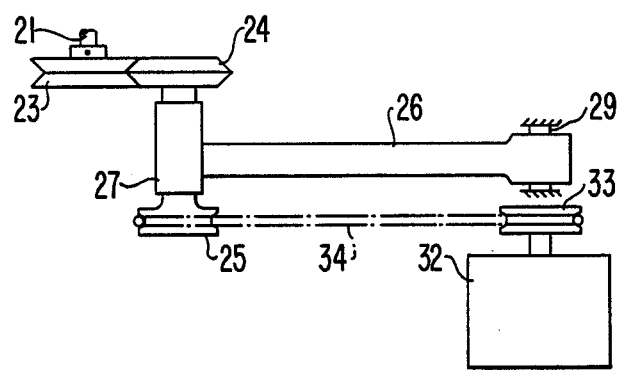
FIG. 3 is a side view of a support arm.

In FIGS. 1-3, numeral 1 designates a disc-like dividing table. This table is fixed horizontally to an axis 2 and is rotated in the arrow A direction (clockwise) intermittently by each 60°. Six vertical tubes 3 are provided at the peripheral part of the table 1 at an equally divided angle. A base piece 4 of each vertical tube 3 is fixed by a bolt. Numeral 5 designates a spindle fitted loosely in the vertical tube 3. Numerals 6 and 7 are an upper arm piece and a lower arm piece respectively and a boss of each arm piece is fitted to a protruding end of the spindle 5 so that upper and lower arm pieces 6, 7 are located along the periphery of the dividing table 1. A drawing spring 8 is wound round the boss of the upper arm piece 6 and both ends of the spring 8 are fastened to pins 9. By this spring 8, arm pieces 6, 7 are held alongside the periphery of the dividing table 1. $B_1$–$B_6$ designate six golf balls of resin outer layer (for example, golf balls of plastic outer layer) having residual burrs along their equator part. Numerals 10 and 20 designate an upper gripper and a lower gripper respectively. In FIG. 2, a golf ball $B_4$ is held at its top part and at its lower part by concaves at opposing end surfaces of the upper and the lower grippers 10, 20, with burrs C at the equator part kept horizontally.

Numeral 11 designates an upper shaft by which the upper gripper 10 is held rotatably. This shaft 11 carries a key way 12 extending over almost its whole length and is put through a tube part 13 so that it is slidable only in vertical direction along a key (not shown) and the upper gripper 10 is rotated freely around the lower end portion of the upper shaft 11. Numeral 14 designates a spacer fixed to a protruding upper end of the upper shaft 11. A horizontal shaft 15 is provided protrudingly at the spacer 14 and a roller 16 is fitted loosely on the horizontal shaft 15. Numeral 17 designates a spring tube which caps the tube part 13 of the upper arm piece 6. This spring tube 17 carries a window hole 18 at its side surface, through which the horizontal shaft 15 is put. The spacer 14 is pressed down by a pressing spring 19 enclosed in the spring tube 17 so as to press the upper gripper 10 against a top part of the golf ball $B_4$. The upper gripper 10 is separated from the golf ball $B_4$ by pushing up the roller 16 by an eccentric cam (not shown). In FIG. 1, the space 14, the roller 16 and the spring 17 are not shown.

Numeral 21 designates a lower shaft fixed to the lower gripper 20. This lower shaft 21 is fitted loosely in a tube part 22 at a forward end of the lower arm piece 7, with a lower end thereof fixed to a fluted friction wheel 23. In FIG. 1, the friction wheel 23 is shown only for a cutting position $S_4$ and is not shown for the other positions ($S_1$, $S_2$, $S_3$, $S_5$ and $S_6$). Thus, the upper and the lower grippers 10, 20 are supported by the upper and the lower arm pieces 6, 7 via the upper and the lower shafts 11, 21. Six sets of the grippers 10, 20 arranged at equally divided angles, along the outer periphery of the dividing table 1, grip golf balls $B_1$, $B_2$, $B_3$, $B_4$, $B_5$ and $B_6$ respectively. The position of each golf ball is $S_1$ (supply position), $S_2$ (inspecting position), $S_3$ (idle position), $S_4$ (cutting position), $S_5$ (good article discharging position) and $S_6$ (faulty goods discharging position) from the right side of the dividing table 1. By intermittent rotation of the dividing table 1, golf balls $B_1$–$B_6$ are transferred one by one from one position to the succeeding position. Cams to push up the upper gripper 10 are provided at the supply position $S_1$ and the discharging positions $S_5$, $S_6$.

Numeral 24 designates a friction wheel for driving. This wheel is provided at the cutting position $S_4$ of the dividing table 1 and on the right side of a friction 23 for being driven. A spindle is fitted loosely in a tube part 27 at a forward end of a support arm 26 and a pulley is fitted to a lower end of the spindle (FIG. 3). The support arm 26 extends horizontally from the left side edge of the dividing table 1, with its elbow part pivotally secured to a support axis 29 and its front arm 26a extended rightward. A pressing spring 28 which is stronger than the drawing spring 8 is fastened to the front arm 26a so that the friction wheel 24 is always forced to make contact with the friction wheel 23. A roller 30 provided at the right side end of the front arm 26a is pressed timely by an eccentric cam 31, whereby the support arm 26 is made to swing in the arrow D direction and the friction wheel 24 is separated from the friction wheel 23. Numeral 32 designates a motor provided right below the elbow part of the support arm 26. A rope 34 is stretched between a pulley 33 on a motor shaft and a pulley on a axis of the friction wheel 24, whereby the friction wheel 24 is rotated at 500–1,000 r.p.m., with the motor 32 as a driving source, and the gripper 20 and the golf ball B gripped by the gripper 20 are also rotated at 500–1,000 r.p.m. via the friction wheel 23. Numeral 35 designates a bite assembly provided on the left side of the cutting position $S_4$ of the dividing table 1. A support axis 36 of the bite assembly 35 is supported by a bracket 37 at a top end of a support board 38. The support board 38 is fitted slidably in lengthwise direction to a support table 39 fixed to a machine body in the right place. By means of a hydraulic pressure device 40 and a spring 41, the bite assembly 35 is fixed to the right place as it is pressed against the equator part of the golf ball B by moderate pressing force. By means of an engaging device 42 and a rotating device 43, the support axis 36 of the bite assembly 35 is rotated so that a bite piece which does cutting action is changeable. Numeral 44 designates a pair of profiling rollers, with their peripheral surface forming a slope to correspond to the equator part of a golf ball. These profiling rollers 44 are provided above and below the right side of the bite assembly 35, with their sloped surface protruding rightward from the peripheral surface of the bite assembly 35 and fitted loosely in an axis 46 at the top end of a bracket 45, whereby upper and lower profiling rollers 44 are rotated freely in the right place.

Figure 4:
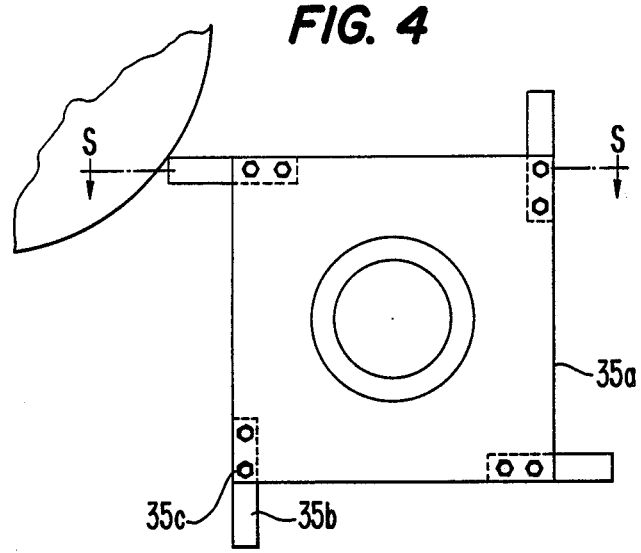
Figure 5:
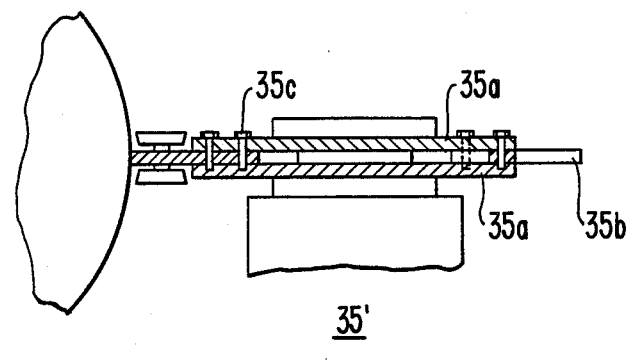

In the above embodiment, the bite assembly 35 is a disc-like bite assembly but can be substituted by a rod-like bite assembly. FIG. 4 and FIG. 5 show a rod-like bite assembly 35'. This bite assembly 35' comprises a plurality of rod-like bites 35b, each being fitted removably by a bolt 35C to a polygonal (square) fitting plate 35a which can be fixed to a support axis 36. Similarly to the disc-like bite assembly 35, the bite piece 35b which does cutting action is changeable by rotating the support axis 36 by means of the engaging device 42 and the rotating device 43.

The method of scraping off burrs by using the apparatus of the above embodiment is explained below.

(I) In the supply position $S_1$, the upper gripper 10 is rising by a cam (not shown) against the force of the spring 18 and when the golf ball $B_1$, with burrs C at its equator part in horizontal state, is sent to the lower gripper 20, the upper gripper 10 descends and the golf ball $B_1$ is sandwitched between the upper and lower grippers 10, 20.

(II) The dividing table 1 rotates by 60° to transfer the golf ball $B_1$ to the inspecting position $S_2$, where the golf ball $B_1$ is rotated slowly for checking whether burrs C are in horizontal state by a photoelectric device.

(III) The dividing table 1 rotates by 60° to transfer the golf ball $B_2$ which passed inspection to the idle position $S_2$. This position $S_2$ is provided for only rotating the dividing table by 60° and no action is made on the golf ball $B_3$.

(IV) The dividing table 1 rotates by 60° to transfer the golf ball $B_3$ to the cutting position $S_4$. Provided at this position $S_4$ are the friction wheel 24, the bite assembly 35 and the profiling rollers 44. When the upper and lower grippers 10, 20 come to the inspecting position $S_4$ as they are gripping the golf ball $B_4$ with its burrs C in horizontal state, the friction wheel 24 makes contact with the friction wheel 23 by means of the pressing spring 28 which acts on the front arm 26a of the support arm, whereby the lower gripper 20 and the golf ball $B_4$ thereon are rotated at the speed of 500–1,000 r.p.m. and the upper gripper 10 rotates freely accompanied by the golf ball. At the same time, elastic force of the pressing spring 28 overpowers the drawing spring 8 wound round the spindle 5, whereby pressing the grippers 10, 20 leftward and pressing the equator part of the golf ball $B_4$ against the profiling rollers 44. Thus, the equator part of the golf ball makes contact with the bite assembly 35 which is fixed and supported by the support board 38 and burrs C are scraped off. At this time, since the bite assembly 35 and the profiling rollers 44 rotate in their right places, no deviation of the center occurs and both rotate accurately, free from the bite assembly 35 eating into the circumferential surface of the golf ball and impairing the degree of true circle. Thus, burrs C protruding from the equator part are scraped off completely.

When scraping of burrs is finished, the cam 31 pushes the front arm 26a of the support arm to separate the friction wheel 24 from the friction wheel 23, whereupon the upper and lower grippers 10, 20 move rightward by elastic force of the drawing spring 8 wound round the spindle 5 and the golf ball $B_4$ is separated from the bite assembly 35 and the profiling rollers 44.

(V) The dividing table 1 rotates by 60° to transfer the golf ball $B_4$ to the good article discharging position $S_5$, where the upper gripper 10 rises and discharges good golf ball $B_5$ which passed cutting process.

(VI) The dividing table 1 rotates further by 60° to raise the upper gripper 10 and discharge faulty golf balls $B_6$. Even if golf balls which were judged to be faulty in the degree of horizontality of burrs at the inspecting position $S_2$ are scraped, not only the burrs cannot be scraped completely but also there is a fear of scraping the circumferential surface. Therefore, when such golf balls are transferred to the scraping positions $S_4$, the golf balls are pushed by the front arm 26a of the support arm and the cam 31 to keep the friction wheel 24 from touching the friction wheel 23 and thus the golf balls are passed thorough the good article discharging position $S_5$, with burrs as they are, and are discharged at the faulty article discharging position $S_6$ to be returned to the supply position $S_1$. These operations (I)-(VI) are repeated to scrape off burrs of golf balls of resin outer layer automatically.

The present invention is not limited to the embodiment mentioned above but can be changed in design within the scope of the subject matter of the invention.

According to the present invention, even if some errors exist in the diameter of golf balls of resin outer layer, only burrs can be scraped off automatically at high efficiency, without impairing the degree of true circle and without generating deformation of golf balls due to frictional heat.

What is claimed is:

1. A burr scraping machine for scraping burrs from a golf ball having a resin outer layer thereon, said machine comprising:

an indexing table rotatable in a plane;

a plurality of spindles mounted on said indexing table around the periphery thereof at equal angular intervals;

an upper arm piece and a lower arm piece rotatably mounted on each spindle;

an upper shaft loosely extending through said upper arm piece for movement through said upper arm piece in a direction perpendicular to the plane of said indexing table;

a lower shaft rotatably mounted in said lower arm piece coalixal with said upper shaft;

an upper gripper rotatably mounted on the lower end of said upper shaft for gripping the top part of a golf ball;

a lower gripper fixed to the upper end of said lower shaft in spaced opposed relation to said upper gripper for gripping the lower part of a golf ball;

pivoting spring means engaged with one of said arm pieces for urging said arm pieces and grippers, when a golf ball is gripped therebetween, to swing radially inwardly of said indexing table;

a driven wheel on the end of said lower shaft opposite the end on which said lower gripper is fixed;

drive wheel means resiliently movable into and out of engagement with said driven wheel for swinging said arm pieces and grippers radially outwardly of said indexing table and rotating said lower shaft;

a bite assembly adjacent the periphery of said indexing table having a bite member support movably mounted at about the equatorial portion of a golf ball held between said upper and lower grippers for movement toward and away from the golf ball and means for urging said bite member support toward and away from the golf ball, a bite member having a plurality of scraping edges thereon and movably mounted on said bite member support for bringing successive scraping edges one at a time into position opposite the equatorial portion of a golf ball for contacting the golf ball when said bite member support is urged toward a golf ball and against which a golf ball held between said upper and lower grippers is urged by said resiliently movable drive wheel means for scraping burrs from the golf ball; and a pair of upper and lower profile rollers positioned above and below said bite member, respectively, and in positions for engaging a golf ball held against said scraping edge for removal of burrs therefrom for preventing the golf ball from being moved toward the scraping edge more than a predetermined distance.

* * * * *